J. DECKER.
Ice-Cream Freezer.
No. 6,661.
Patented Aug. 21, 1849.
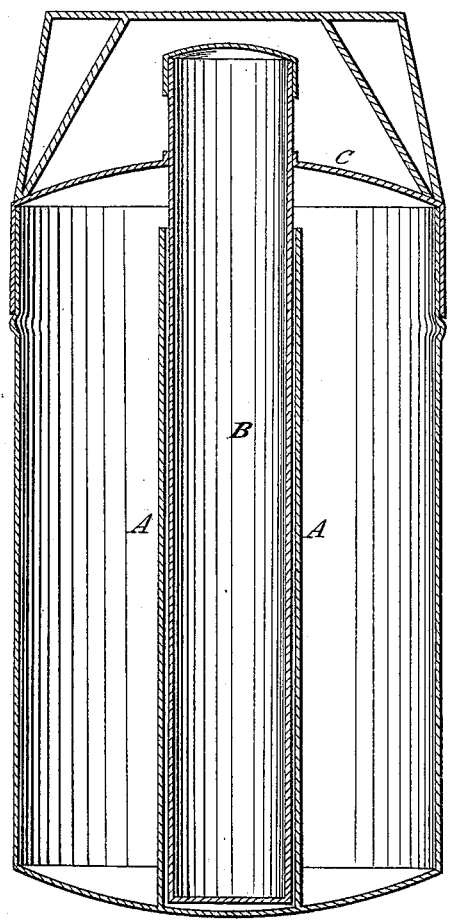

UNITED STATES PATENT OFFICE.

JOHN DECKER, OF BEL AIR, MARYLAND.

ICE-CREAM FREEZER.

Specification of Letters Patent No. 6,661, dated August 21, 1849.

*To all whom it may concern:*

Be it known that I, JOHN DECKER, of Bell Air, in the county of Harford and State of Maryland, have invented a new and useful Improvement in Ice-Cream Freezers; and I do hereby declare the following to be a full and exact description thereof, reference being had to the accompanying drawings, making a part of this specification.

The nature of my invention consists in locating and securing a tube A, in the center of the body of an ice cream freezer, for the reception of the tube B, secured to, and descending from the cover C, for the purpose hereinafter set forth. The tube B, descending from the cover C, for the reception of ice, has been before used to facilitate the freezing of cream; the use of it has however been attended with inconvenience, in consequence of the large quantity of cream that adhered to it, which has to be removed every time the cover is withdrawn; and also from the great care required to prevent the soiling of the tube while it is removed from the freezer. By combining the tube A, with the body of the freezer, to receive the ice holding tube B, descending from the cover, the cover can be easily withdrawn whenever it is necessary to remove the frozen cream that adheres to the sides of the freezer, and enables the operator to remove the frozen cream from the surface of the tube A, at the same time that he removes it from the sides of the freezer. This arrangement also prevents all danger of introducing impurities into the cream upon the tube A, that may adhere to it while it is withdrawn.

What I claim as my invention and desire to secure by Letters Patent, is—

The location of the tube A, within the body of the freezer and forming a part of the same, when combined with the ice-tube B, descending from, and made fast the cover, substantially in the manner and for the purpose herein set forth.

The above specification signed this 31st day of Jan., 1849.

JOHN DECKER.

Witnesses:
 Z. C. ROBBINS,
 JOSEPH W. MARLL.